United States Patent
Ansari et al.

(10) Patent No.: US 9,069,774 B1
(45) Date of Patent: Jun. 30, 2015

(54) GRAPHICAL VISUALIZATION AND MANAGEMENT OF NETWORKS

(75) Inventors: Morteza Ansari, Newark, CA (US);
Eric Duchene, Sunnyvale, CA (US);
Etienne M. Liu, San Jose, CA (US);
Barry A. Frew, Carmel Valley, CA (US)

(73) Assignee: Infoblox Inc., Santa Clara, CA (US)

( * ) Notice: Subject to any disclaimer, the term of this patent is extended or adjusted under 35 U.S.C. 154(b) by 442 days.

(21) Appl. No.: 12/590,245

(22) Filed: Nov. 3, 2009

Related U.S. Application Data

(60) Provisional application No. 61/198,333, filed on Nov. 4, 2008.

(51) Int. Cl.
| | | |
|---|---|---|
| G06F 17/30 | (2006.01) | |
| H04L 29/12 | (2006.01) | |
| G06F 11/30 | (2006.01) | |
| G06F 19/26 | (2011.01) | |

(52) U.S. Cl.
CPC ........ *G06F 11/3006* (2013.01); *H04L 61/6068* (2013.01)

(58) Field of Classification Search
CPC . H04L 63/1425; H04L 61/6068; G06F 21/55; G06F 17/2247; G06F 17/30867; G06F 17/30861; G06F 11/3006; G06F 11/3438; G06F 19/26; G06F 2201/875
USPC ............... 715/733–739, 741–743, 846–847, 715/853–855; 709/220–222
See application file for complete search history.

(56) References Cited

U.S. PATENT DOCUMENTS

| | | | | |
|---|---|---|---|---|
| 6,137,782 | A  * | 10/2000 | Sharon et al. ................. | 370/255 |
| 6,535,227 | B1 * | 3/2003 | Fox et al. ...................... | 715/736 |
| 6,941,359 | B1 * | 9/2005 | Beaudoin et al. ............. | 709/221 |
| 7,127,505 | B2 | 10/2006 | Boylan et al. | |
| 7,330,907 | B2 | 2/2008 | Boylan et al. | |
| 7,373,397 | B2 * | 5/2008 | Johnson et al. ............... | 709/220 |
| 7,587,675 | B2 * | 9/2009 | Cunningham et al. ........ | 715/734 |
| 7,623,547 | B2 | 11/2009 | Dooley et al. | |
| 8,239,535 | B2 * | 8/2012 | Error et al. .................... | 709/226 |
| 8,443,074 | B2 * | 5/2013 | Bahl et al. ..................... | 709/224 |

(Continued)

OTHER PUBLICATIONS

Allcock et al., "GridMapper: A Tool for Visualizing the Behavior of Large-Scale Distributed Systems", Proceedings of the 11th IEEE Symposium on High Performance Distributed Computing, IEEE 2002.*

Caceres et al., "Measurement and Analysis of IP Network Usage and Behavior", Communications Magazine, IEEE, vol. 38, Issue 5, May 2000.*

(Continued)

*Primary Examiner* — Andrew Tank
(74) *Attorney, Agent, or Firm* — Van Pelt, Yi & James LLP

(57) ABSTRACT

A method is disclosed. A graphical representation is displayed of a network map of a network. A context indication is received for a network information specification for a first network segment of the network displayed on the graphical representation of the network map of the network. A first information is displayed on the graphical representation for the first network segment in response to the context indication. An action indication is received for a network management specification for the first network segment based at least in part on an interaction with the graphical representation of the network. The first network segment is modified based at least in part on the network management specification in response to the action indication.

19 Claims, 14 Drawing Sheets

(56) References Cited

U.S. PATENT DOCUMENTS

| | | | |
|---|---|---|---|
| 2004/0268125 A1* | 12/2004 | Clark et al. | 713/166 |
| 2007/0011297 A1 | 1/2007 | Boylan et al. | |
| 2007/0028142 A1* | 2/2007 | Elsner et al. | 714/25 |
| 2007/0043860 A1* | 2/2007 | Pabari | 709/224 |
| 2007/0180449 A1* | 8/2007 | Croft et al. | 718/1 |
| 2008/0004035 A1* | 1/2008 | Atkins et al. | 455/454 |
| 2008/0140843 A1 | 6/2008 | Boylan et al. | |
| 2009/0249213 A1* | 10/2009 | Murase et al. | 715/735 |

OTHER PUBLICATIONS van Riel, "Multi-dimensional Visualization for the Analysis of Internet Traffic and the Identification of Intrusive Activity", Thesis submitted in partial fulfillment of the requirements of the degree Bachelor of Science (Honours), in the Department of Computer Science, Rhodes University, Nov. 10, 2005.*

Abdullah, "Scaling and Visualizing Network Data to Facilitate in Intrusion Detection Tasks", Thesis submitted in Partial Fulfillment of the Requirements for the Degree Doctor of Philosophy, School of Electrical and Computer Engineering, Georgia Institute of Technology, May 2006.*

* cited by examiner

GRAPHICAL VISUALIZATION AND MANAGEMENT OF NETWORKS

CROSS REFERENCE TO OTHER APPLICATIONS

This application claims priority to U.S. Provisional Patent Application No. 61/198,333 entitled GRAPHICAL VISUALIZATION AND MANAGEMENT OF IPV4 NETWORKS filed Nov. 4, 2008 which is incorporated herein by reference for all purposes.

BACKGROUND OF THE INVENTION

Computer networks typically require a network administrator to view and manage networks and subnets. Managing computer networks, such as Internet Protocol ("IP") networks include tasks over one or more network nodes. Frequently the administrator will create, edit and delete networks and subnets. Traditionally the administrator may use a table to keep track of more than one subnet, wherein the table includes each subnet's starting and ending addresses, and in some cases a subnet mask. A managed set of one or more networks may include many network nodes, for example, IP version 4 ("IPv4") networks may include two to the power of 32 nodes, or over four billion nodes.

In many networks, network addresses are based in binary, but represented in decimal or dotted decimal notation. For example, in IPv4 node addresses are represented by four octets separated by dots: "xxx.xxx.xxx.xxx". This makes using a table to administer the network cumbersome as binary network addresses and representations, for example subnet masks, are not intuitive in decimal. If there are many subnets in a network, the table may be very long. There exists a need to view and manage networks and subnets using methods more efficient than a table.

BRIEF DESCRIPTION OF THE DRAWINGS

Various embodiments of the invention are disclosed in the following detailed description and the accompanying drawings.

DETAILED DESCRIPTION

Figure 1:
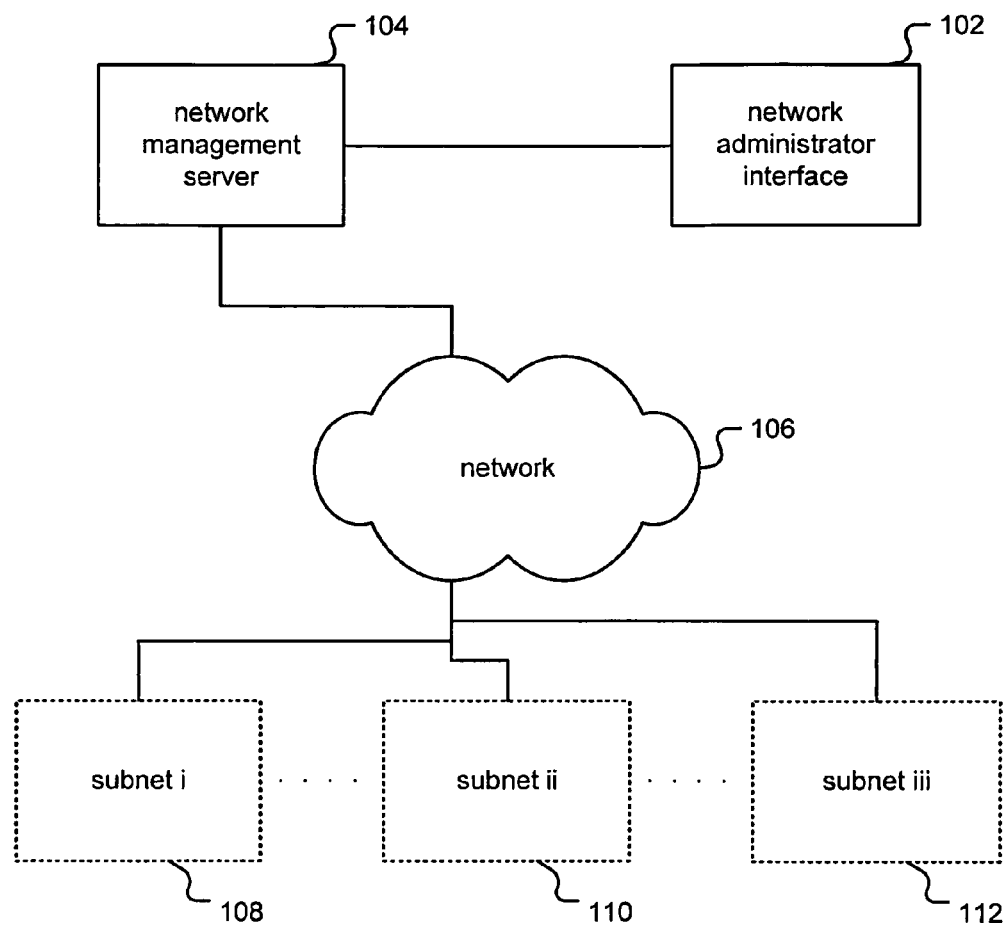
FIG. 1 is a block diagram illustrating an embodiment of a system for managing networks.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A graphical system of visualizing and managing networks is disclosed. A multidimensional color graphical representation of the network is displayed based on a chosen range of network nodes starting and ending at any arbitrary address. In some embodiments, a two-dimensional grid is used as a graphical representation of a network and/or network segment. In some embodiments, the network is an IP network, an IPv4 network or an IPv6 network. Throughout this specification examples are given for IPv4 networks in particular but the systems and methods may be applied to any general type of network including, for example an IPv6 network. Throughout this specification examples are given for two-dimensional representations in particular but the systems and methods may be applied to any graphical representation including, for example three-dimension representations or non-rectangular patterns.

A network administrator may use the displayed graphical representation with a human interface device ("HID") to visualize the network space, for example:

identifying a specified network range or network container using in part an HID pointer manipulation such as a click;

identifying a status/attribute of a specified network range using colors and/or a gradient detailing (for example, a pattern based on rows of dots);

zooming in or out of a network range using in part an HID pointer manipulation such as a click, double-click, or click and drag; and jumping within network hierarchies or subnets using in part an HID pointer manipulation in conjunction with breadcrumbs and/or a graphical user interface (for example, a slider bar or slider scale).

A network administrator may also use the displayed graphical representation with a human interface device ("HID") to manage the network space, for example:

identifying a specified empty space range using in part an HID pointer manipulation and indicating to the network administrator the largest possible network in the specified empty space, and/or how many possible networks can be created with each possible octet (or hexadectet) boundary;

identifying a specified empty space range using in part an HID pointer manipulation and indicating to the network administrator the largest possible network in the specified empty space, and/or how many possible networks can be created with each possible subnet mask/network bits;

identifying the first suitably large empty space just from the network or subnet mask (which also specifies the size of the network);

identifying a specified empty space range using in part an HID pointer manipulation and receiving from the network administrator a network management specification including a configuration of a mask, position and size of a new network within the empty space;

moving a proposed new network within an empty space using in part an HID pointer manipulation, for example a drag and drop action, from one position to another;

editing properties and/or attributes of a new network or existing network using in part an HID pointer manipulation to specify the edited network;

deleting an existing network using in part an HID pointer manipulation to specify the existing network;

modifying an existing network, for example splitting, joining or resizing an existing network, using in part an HID pointer manipulation to specify the existing network; and running a discovery on a specified network or clearing objects in the network using in part an HID pointer manipulation.

FIG. 1 is a block diagram illustrating an embodiment of a system for managing networks. In the example shown, a network administrator interfaces with a system using network administrator interface 102 coupled to the network management server 104. Network management server is coupled to network 106, which may be coupled directly or indirectly to one or more subnets, and in the example shown at least three subnets: subnet i 108, subnet ii 110, and subnet iii 112.

Network administrator interface 102 may include a web browser or a direct keyboard, video and/or mouse interface to the network management server 104. Network management server 104 may include a web server to interface with a web browser in network administrator interface 102 as well as a network management server. In some embodiments the network management server 104 may be spread across a plurality of cores, processors and/or physical servers. Network 106 may be a public or private network and/or combination thereof, for example the Internet, an Ethernet, serial/parallel bus, intranet, Local Area Network ("LAN"), Wide Area Network ("WAN"), and other forms of connecting multiple systems and/or groups of systems together. The network protocol used may be IPv4, IPv6, another Internet Layer protocol, a Network Layer protocol, an OSI protocol, or any computer-based network protocol.

Network subnets 108-112 form part of the network being managed by the network administrator using the network management server 104. Throughout this specification a routing prefix notation is used for example IPv4 networks comprising a "/" character and a decimal number specifying the number of consecutive bits of the routing prefix for a subnet: for example a /30 subnet contains addresses for four IPv4 addresses (including gateway and/or broadcast addresses), and a /20 subnet contains addresses for 4096 IPv4 addresses (including gateway and/or broadcast addresses.)

Throughout this specification a "leaf network" refers to a network segment or subnet that contains no further subnets. For example, an Acme company with a single Class A IPv4 /8 network may have a district office in San Francisco with six network nodes each with one IPv4 address; one possible subnet within their network would be a /29 leaf network. Throughout this specification a "network container" refers to a network segment or subnet that contains further leaf networks. For the Acme company example, there may be a district region in Nevada with a /24 network container with two /29 leaf networks for Las Vegas and Reno.

Figure 2A:
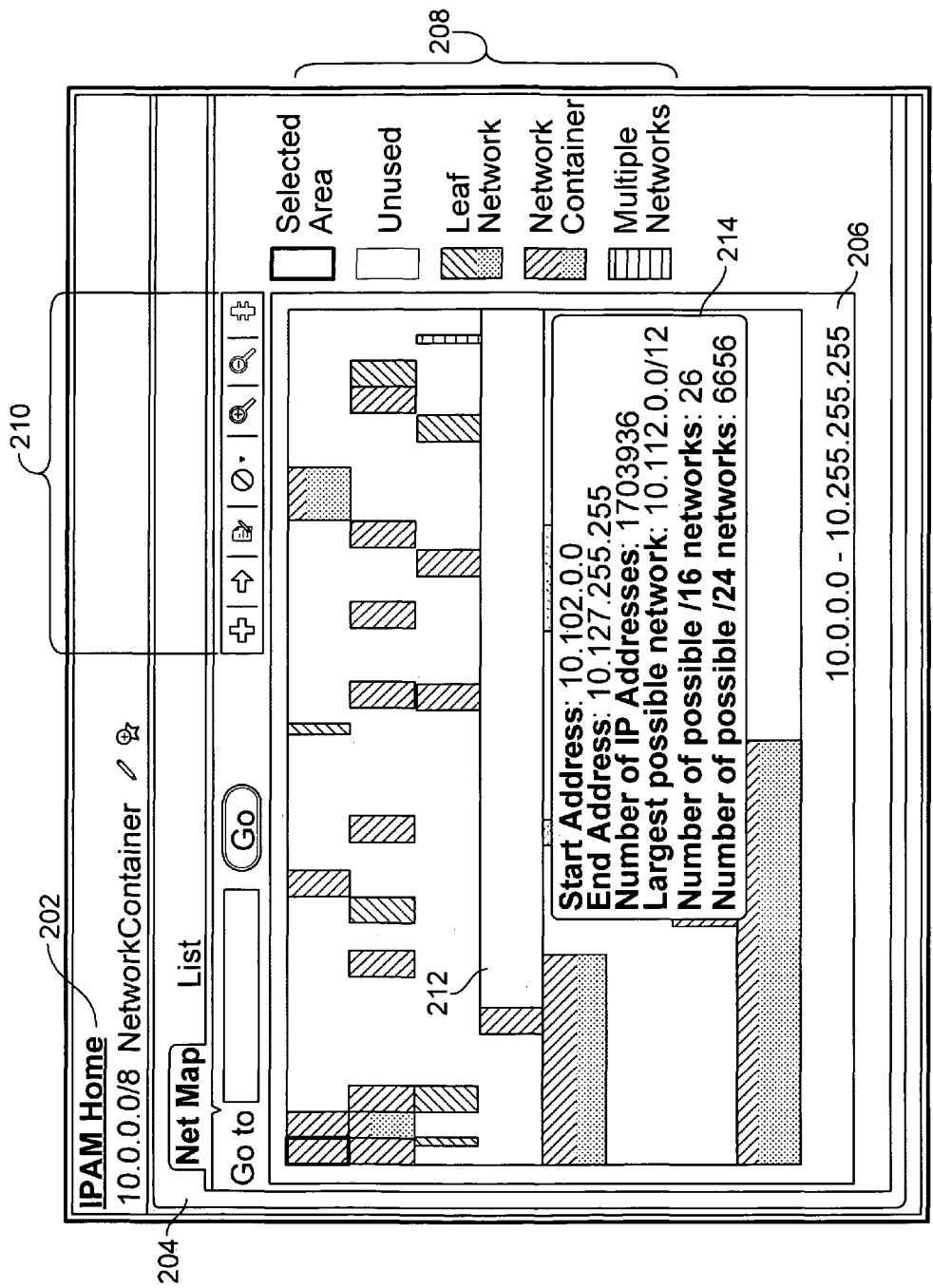
FIG. 2A is a diagram illustrating an embodiment of a graphical interface for showing the largest possible network in an empty space.

FIG. 2A is a diagram illustrating an embodiment of a graphical interface for showing the largest possible network in an empty space. In some embodiments, the interface depicted in FIG. 2A may be found displayed as a portion, frame and/or widget of a web page in a browser on network administrator interface 102.

In the example shown, the network administrator manages the IPv4 network container "10.0.0.0/8" (202) with a graphical representation of a network map of the network (204) and the range of IPv4 being actively managed with the graphical representation ranging from "10.0.0.0" through "10.255.255.255" (206). A sidebar (208) depicts a key to the displayed graphical representation, especially with regards to blocks that represent network space.

The graphical representation may comprise a multidimensional space, including a two-dimensional visual grid with networks being represented as blocks within the grid. Line weights and patterns, colors and fill patterns, and gradient details may be used to represent different attributes of networks, network segments, subnets and/or nodes.

In the example shown, a thick grey line may indicate an area selected with the HID pointer or keyboard. In some embodiments, a context indication, for example a mouse click, allows the network administrator interface 102 to focus management over network range and/or network segment. In some embodiments, the administrator may select multiple networks using a ctrl-click indication. The system may then respond with information for the network segment, for example by drawing a thick grey line around the block representing the focused network range/segment.

An unused or empty space without any subnets may be white fill with a light grey border. A leaf network may be a dark grey fill with a gradient detail of rows of dots indicating one or combination of metrics of the leaf network. In some embodiments a metric may be a subnet utilization, a ratio of assigned node addresses to the sum of assigned and unassigned node addresses. As the subnet utilization increases, more rows of dots are drawn from the bottom, for example, a 0% utilization may have 0 or 1 rows of dots on the bottom of a block, a 50% utilization may have the lower half of the block in rows of dots, and a 100% utilization may have a block filled with rows of dots.

In another embodiment (not shown), colors may be used to indicate a metric, for example green may indicate 0-60% utilization, yellow may indicate 61%-90% utilization, and red may indicate 91-100% utilization. In another embodiment (not shown), gradient color intensity may be used to indicate a metric, for example a color with RGB value of [Red=0, Green=X, Blue=0] may indicate X % utilization, for example [Red=0, Green=48, Blue=0] may indicate 48% utilization.

A network container may be a light grey fill with a gradient detail similar to the leaf network described above. In some cases, a plurality of networks may be too small to be displayed individually on the network map 204 given the resolution of the map. A "multiple networks" block with a hashed area as shading may indicate that more than one network exists in the area that cannot be visually resolved in the graphical representation. For example, in a /8 network, networks smaller than /20 and that are beside each other may be represented as a multiple networks block.

A toolbar (210) displays a set of functions that the network administrator can modify the network space/range indicated with the context indication described above. In some embodiments the same standard functions are available by another method, for example right clicking to bring up a context menu. After indicating a function with an action indication (for example, a left click of the mouse), the network management server 104 can then modify the network. In some embodiments, an authorization protocol is checked before the network management server 104 is permitted to modify the network, for example based on the username and password or credentials of the user of the network administrator interface 102.

Functions and their corresponding buttons in toolbar 210 may include an Add network button to add a network. For example, once a network administrator clicks on the add button, a panel above the map may appear with a slider, a cancel button, and a launch wizard button. If the administrator selected an empty area (212) prior to clicking on add network button, the slider can only move as high as the largest network that can be created in that space. If the administrator has not selected an empty area, the slider can go up to the largest network that can fit in any opening in the network.

The outline of this network is drawn on the map at this point on the first legal empty space. The administrator can then change the netmask, drag the outline of the network that is drawn on the map to other legal positions for that map, cancel out of the operation, or launch the wizard for the actual creation of the network. Note that at no point does an administrator have to provide or calculate a network number, rather it is made more convenient for the administrator in that the number is determined by network management server 104 as the network is moved around on the map 204. Another convenience is that the system shows the largest possible network in the empty space, and how many possible networks can be created with each possible octet boundary.

Once the administrator has finalized the location for the network to be created, they can click on the "Launch Wizard" icon to bring up the IPv4 network wizard pre-populated with the network address and netmask to allow user to actually create the network. At this point, the panel that was drawn on top of the map is hidden again and the administrator can finalize the creation of the network by moving forward with the wizard or cancel out of the operation to get back to the map. If the administrator completes the wizard steps and actually creates the network, the map is redrawn displaying the newly created network.

Other buttons and/or functions may include:
Open: the administrator must select a network segment first using a context indication as described above. This function opens another network map for the selected subnet (if the network segment is a network container), a node map (if the network segment is a leaf network), or a range (if the network segment is based on a multiple networks block).
Edit: the administrator must select a network segment first using a context indication as described above. This function opens a network editor to assign, for example, network properties including extensible attributes and/or metadata to the network segment.
Delete: the administrator must select a network segment first using a context indication as described above.
Zoom: as will be described in FIGS. 3A-3E below.

In the example shown, network information 214 will be displayed with regards to the empty space 212 that the network administrator has asserted a context indication on. The network information 214 may be displayed as a highlighted set of blocks, tooltip and/or window. The network information 214 includes the start address of the empty space, the end address of the empty space, the number of IP addresses available in the empty space, the largest possible subnet in the empty space, and the number of possible /16 subnets and /24 subnets.

Figure 2B:
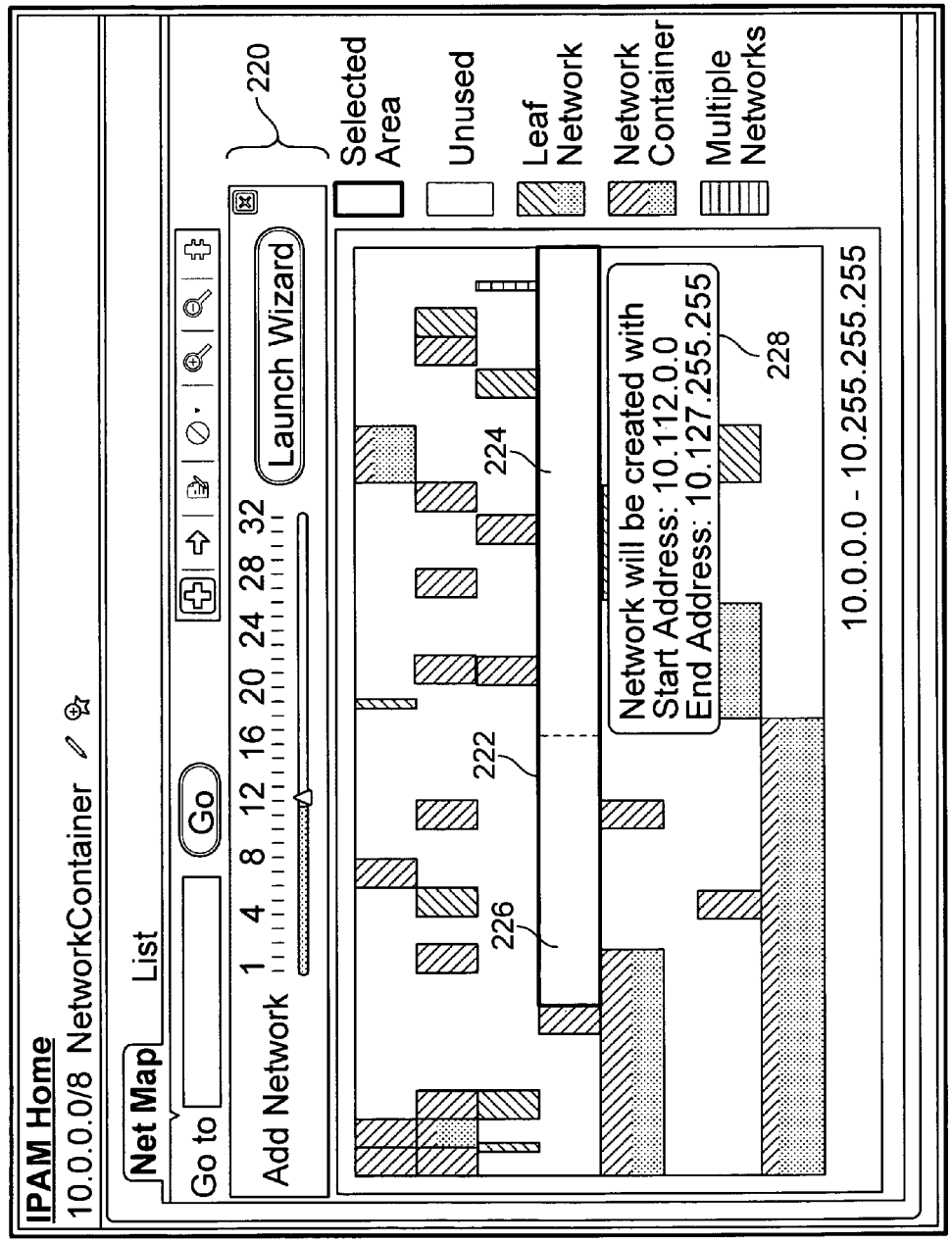
FIG. 2B is a diagram illustrating an embodiment of a graphical interface for configuring a proposed new network in an empty space.

FIG. 2B is a diagram illustrating an embodiment of a graphical interface for configuring a proposed new network in an empty space. In some embodiments, the interface depicted in FIG. 2B may be found displayed as a portion, frame and/or widget of a web page in a browser on network administrator interface 102. In some embodiments, the interface depicted in FIG. 2B may follow an administrator asserting an action indication for "Adding a network" over a range asserted in a context indication, or a default of the largest empty network space.

In some embodiments, a panel (220) may be displayed to size the new network and/or configure the possible subnet masks for the new network. In some embodiments a slider panel may be used. In some embodiments the panel is automatically positioned on the largest possible mask. In the empty network space (222) the position and size of the new network is graphically shown in the map using a line and fill convention (224) as well as the portion of space that will remain empty (226). The user may adjust the size using the panel 220, or the position of the new network of the space 224 by corresponding directly with the graphical representation of the network map, for example dragging the new network 224 within the space 222. As the administrator makes adjustments for the new network, a corresponding network information (228) may be displayed as a highlighted set of blocks, tooltip and/or window. The corresponding network information 228 includes the start address and end address of the new network 224 and/or the number of IP addresses available in the new network (not shown).

Figure 2C:
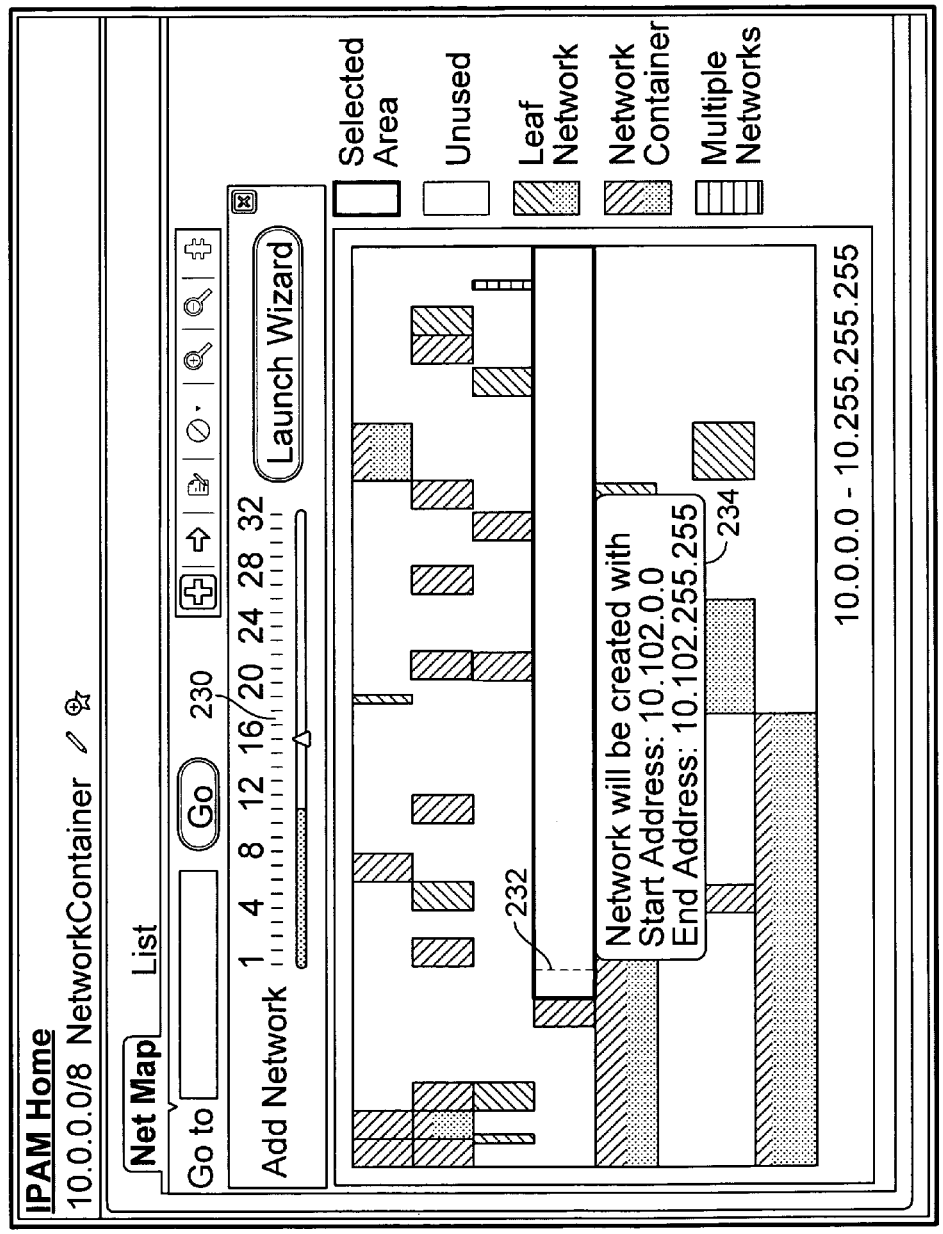
FIG. 2C is a diagram illustrating an embodiment of a graphical interface for resizing a proposed new network in an empty space.

FIG. 2C is a diagram illustrating an embodiment of a graphical interface for resizing a proposed new network in an empty space. In some embodiments, the interface depicted in FIG. 2C may be found displayed as a portion, frame and/or widget of a web page in a browser on network administrator interface 102. In some embodiments, the interface depicted in FIG. 2C may follow an administrator asserting an action indication for "resizing a network" in the panel 220 in FIG. 2B.

By changing the subnet mask to a different value (230) and/or changing the start address of the network 224 in empty space 222, the system automatically/dynamically shows a resizing and repositioning of the network (232) and updates the corresponding network information (234).

Figure 2D:
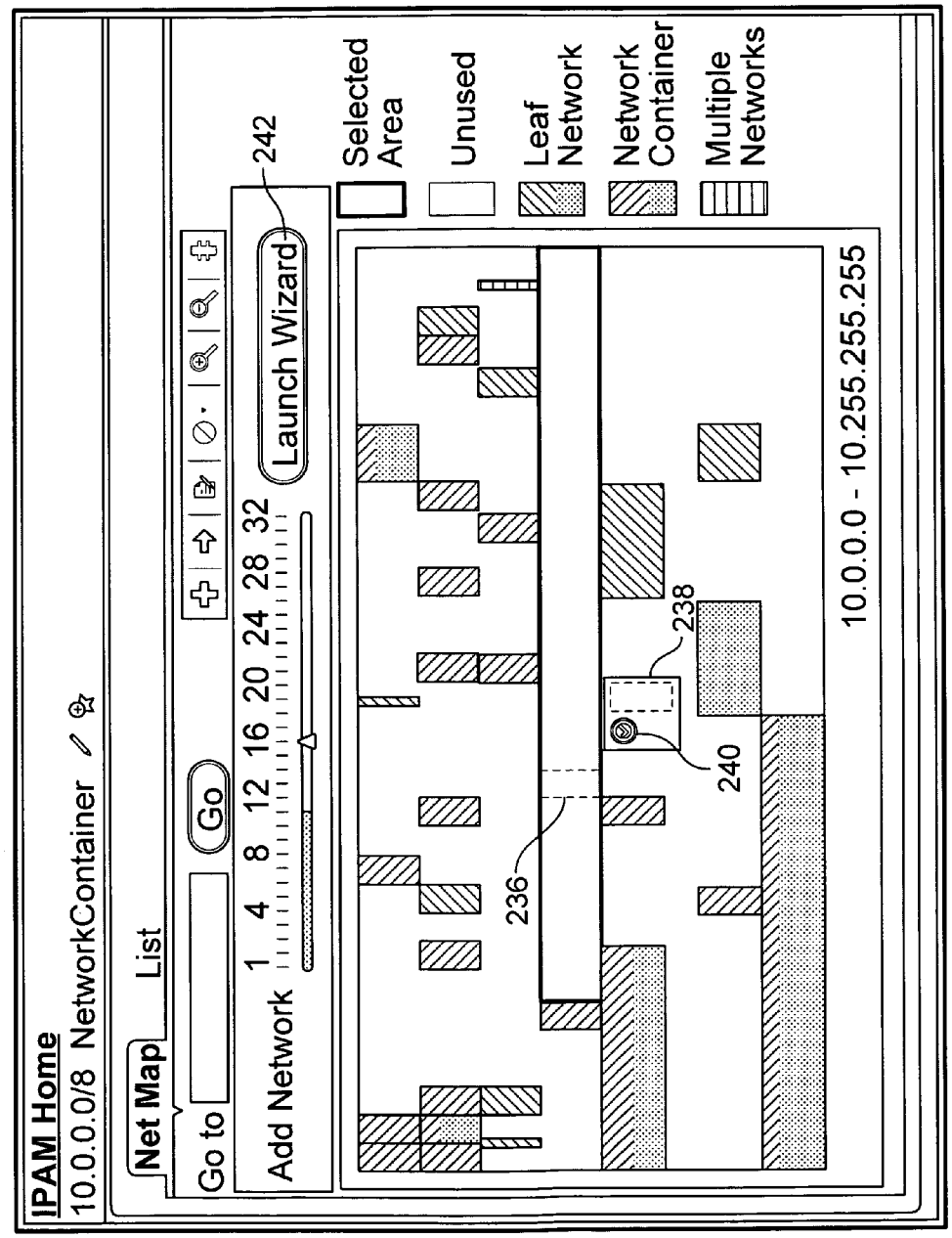
FIG. 2D is a diagram illustrating an embodiment of a graphical interface for repositioning a proposed new network.

FIG. 2D is a diagram illustrating an embodiment of a graphical interface for repositioning a proposed new network. In some embodiments, the interface depicted in FIG. 2D may be found displayed as a portion, frame and/or widget of a web page in a browser on network administrator interface 102. In some embodiments, the interface depicted in FIG. 2D may follow an administrator asserting an action indication for "repositioning a network" in FIG. 2C. For example an administrator may want to leave some empty space next to an existing network that could need to be extended in the future.

By selecting network 232 using a context indication (e.g. clicking on the proposed new network) and then using an action indication (e.g. by dragging and dropping the proposed new network) the location of network 232 may change. The proposed location may either be within the empty space (236), or outside the empty space (238). In some embodiments when proposing outside the empty space, an indicator (240) may show that the space is legal, possible, or authenticated. After a suitable size and position of the new network is chosen, a single button (242) or other indication may be asserted to proceed in network creation.

Figure 2E:
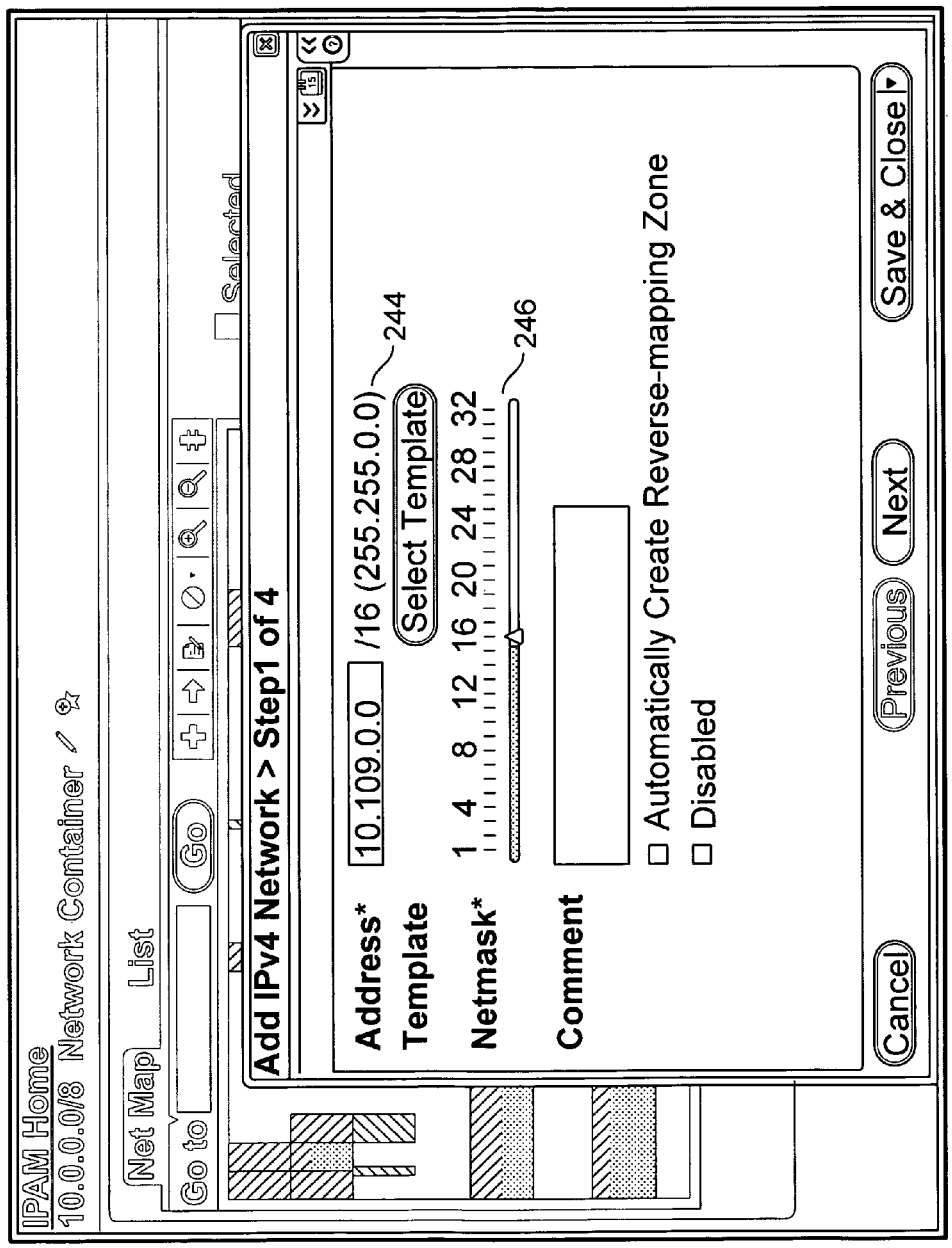
FIG. 2E is a diagram illustrating an embodiment of a graphical interface for creating a proposed new network.

FIG. 2E is a diagram illustrating an embodiment of a graphical interface for creating a proposed new network. In some embodiments, the interface depicted in FIG. 2E may be found displayed as a portion, frame and/or widget of a web page in a browser on network administrator interface 102. In some embodiments, the interface depicted in FIG. 2E may follow an administrator asserting an indication 242 for "creating a network" in FIG. 2D. For example, the system may launch an "Add network" wizard, pre-populated with the network settings.

In some embodiments the wizard would be a separate panel or window, deprecating the previous panel 204 to focus the administrator's attention. The pre-populated window settings may include the address (244) and the netmask (246).

Figure 2F:
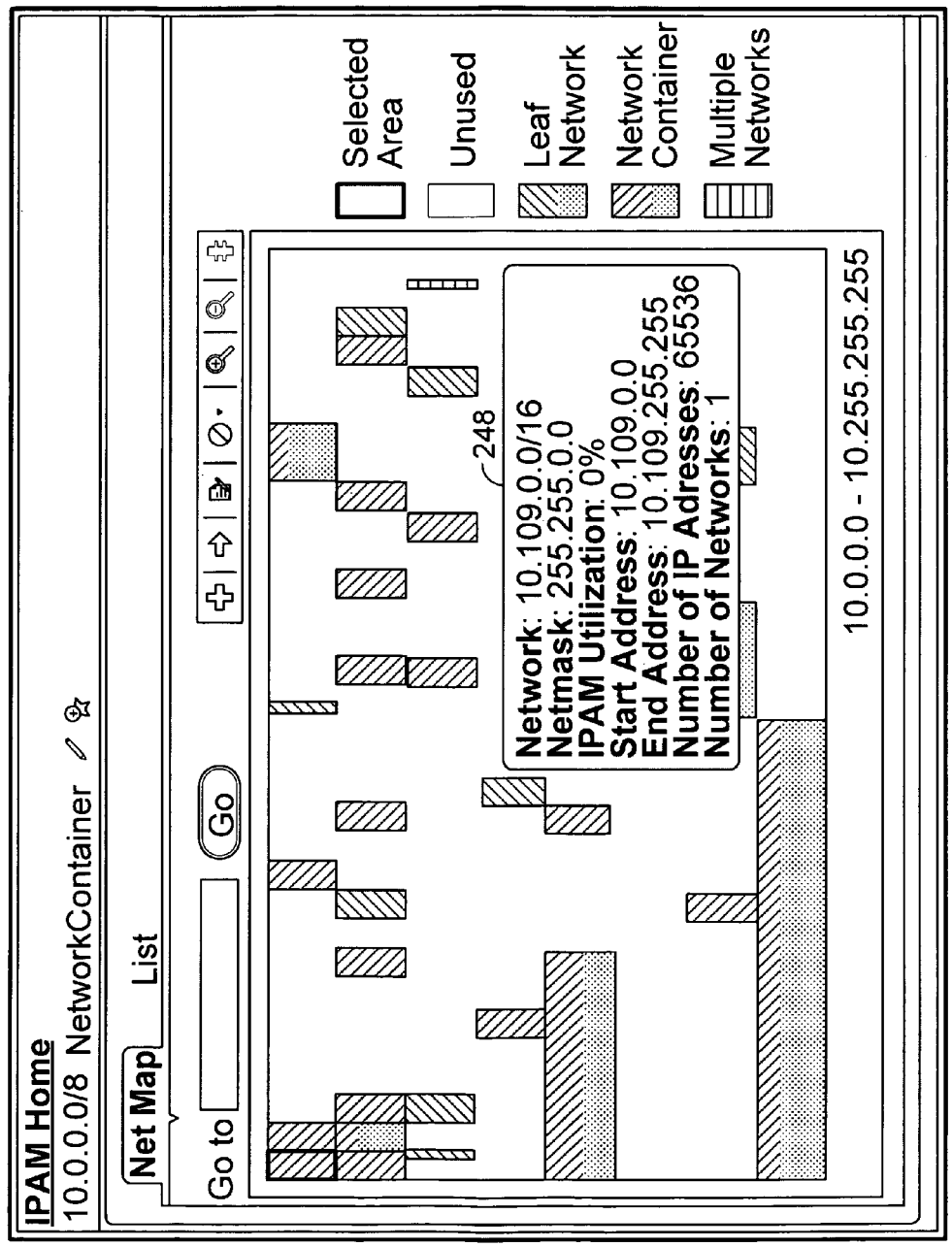
FIG. 2F is a diagram illustrating an embodiment of a graphical interface after creating a proposed new network.

FIG. 2F is a diagram illustrating an embodiment of a graphical interface after creating a proposed new network. In some embodiments, the interface depicted in FIG. 2F may be found displayed as a portion, frame and/or widget of a web page in a browser on network administrator interface 102. In some embodiments, the interface depicted in FIG. 2F may follow an administrator completing the "Add network" wizard in FIG. 2E. For example, after the administrator fills in the details in wizard and saves it, a new network is displayed in the map, and optionally with network information (248). In the figure shown, the new network is hidden by the network information 248.

The network information 248 includes the network name, index, netmask, a metric (such as IP address management utilization), start address of the empty space, the end address of the empty space, the number of IP addresses available in the empty space, and the number of subnets within the network, for example a single number of subnets means it is a leaf network.

Figure 2G:
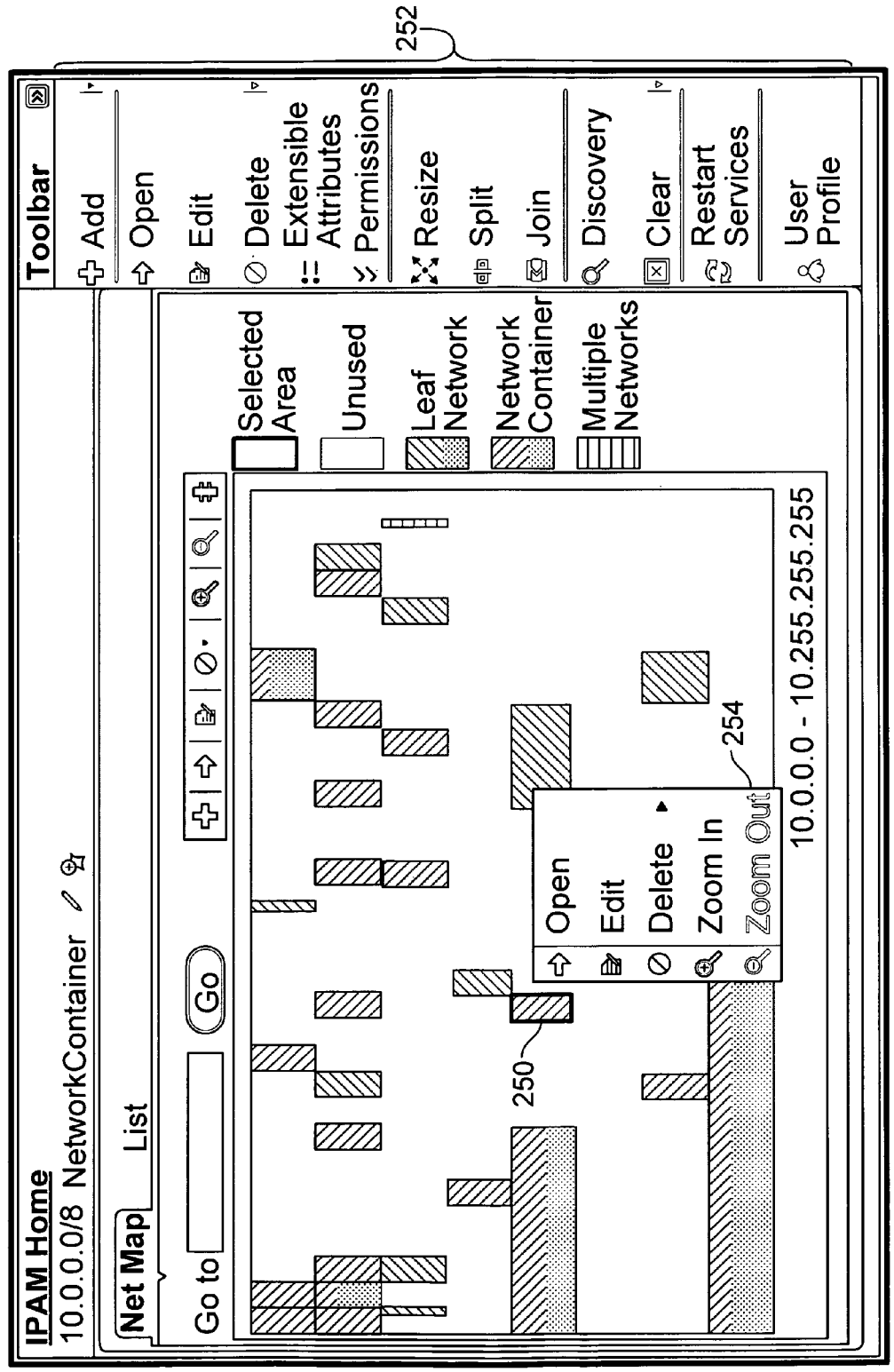
FIG. 2G is a diagram illustrating an embodiment of a graphical interface for managing a network segment.

FIG. 2G is a diagram illustrating an embodiment of a graphical interface for managing a network segment. In some embodiments, the interface depicted in FIG. 2G may be found displayed as a portion, frame and/or widget of a web page in a browser on network administrator interface 102. For example, an administrator may select a network segment using a context indication and take action on it using vertical and/or horizontal toolbars, or using a right-click context menu to edit properties, delete, modify (split, join, resize), run a discovery on the network, clear objects in the network and other actions.

After the administrator selects the network segment, the system displays on the graphical representation an information for the network segment in response to the context indication, for example a thick grey line around the selected network segment (250). The administrator may then assert an action based on the toolbar (252), including: adding a network, opening a network (either going to an IP address map if the network segment is a leaf network, or a second graphical representation that shows only the selected network segment if the network segment is a multiple networks block or network container block), zooming into or out of the network segment, editing the network, viewing/modifying extensible attributes of the network segment, viewing/modifying permissions and authentication lists for the network segment, resizing the network segment, splitting the network segment, joining the network segment, running a discover on the network segment, restarting services, or setting a corresponding user profile.

In some embodiments there are alternate ways to assert an action indication, for example along with the toolbar 252 there is also a contextual menu 254 that may include a subset or superset of the operations for a network segment or empty space.

Figure 3A:
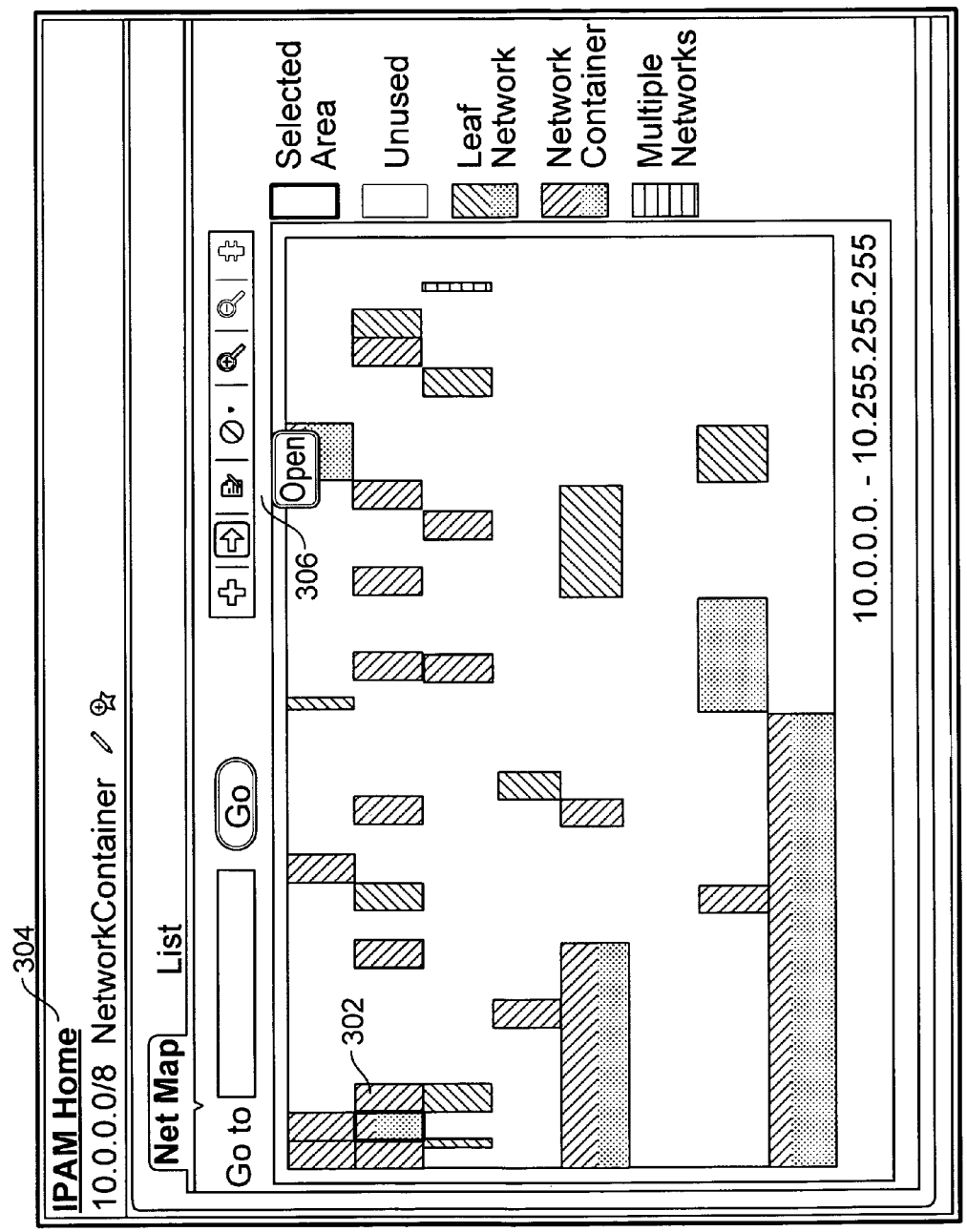
FIG. 3A is a diagram illustrating an embodiment of a graphical interface for navigating within networks.

FIG. 3A is a diagram illustrating an embodiment of a graphical interface for navigating within networks. In some embodiments, the interface depicted in FIG. 3A may be found displayed as a portion, frame and/or widget of a web page in a browser on network administrator interface 102. For example, an administrator can identify a network container in the graphical network map by selecting it manually or using a "go to" dialog box to specify it with a keyboard, then clicking on open to see the subnets under it.

In the example shown, an administrator has asserted a context indication for a network container (302) within a network/network segment (304), shown 10.0.0.0/8, and the system responds with a piece of information, the information being a dark grey border around the selected network container. The administrator then asserts an action indication to "open" the network container (304).

Figure 3B:
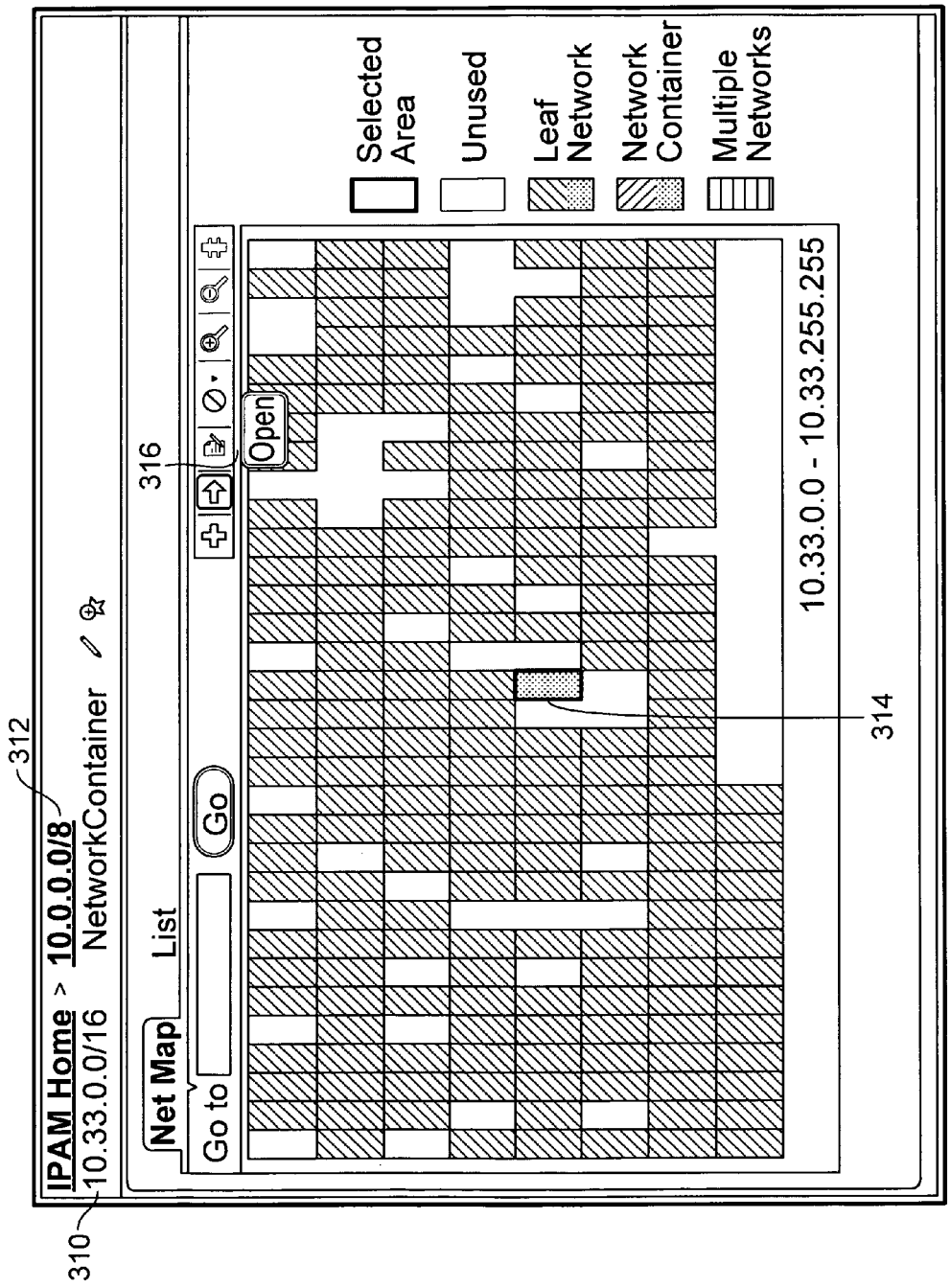
FIG. 3B is a diagram illustrating an embodiment of a graphical interface for navigating within networks in a first network container level.

FIG. 3B is a diagram illustrating an embodiment of a graphical interface for navigating within networks in a first network container level. In some embodiments, the interface depicted in FIG. 3B may be found displayed as a portion, frame and/or widget of a web page in a browser on network administrator interface 102. In some embodiments, the interface depicted in FIG. 3B may follow an administrator asserting an indication 306 for opening the selected network 302 in FIG. 3A. For example, the administrator may traverse one level down, and can view the subnet or continue to select a network container at this level and click on open again.

After traversing one level down, the graphical network map is now of the network container 302, here shown (310) as "10.33.0.0/16". In some embodiments, a set of "breadcrumbs" (312) is shown to allow the administrator a convenient interface to back up hierarchical levels of network.

In the example shown, an administrator has asserted a context indication for a network container (314) within the current network container and the system responds with piece of information, the information being a dark grey border around the selected network container. The administrator then asserts an action indication to "open" the network container (316).

Figure 3C:
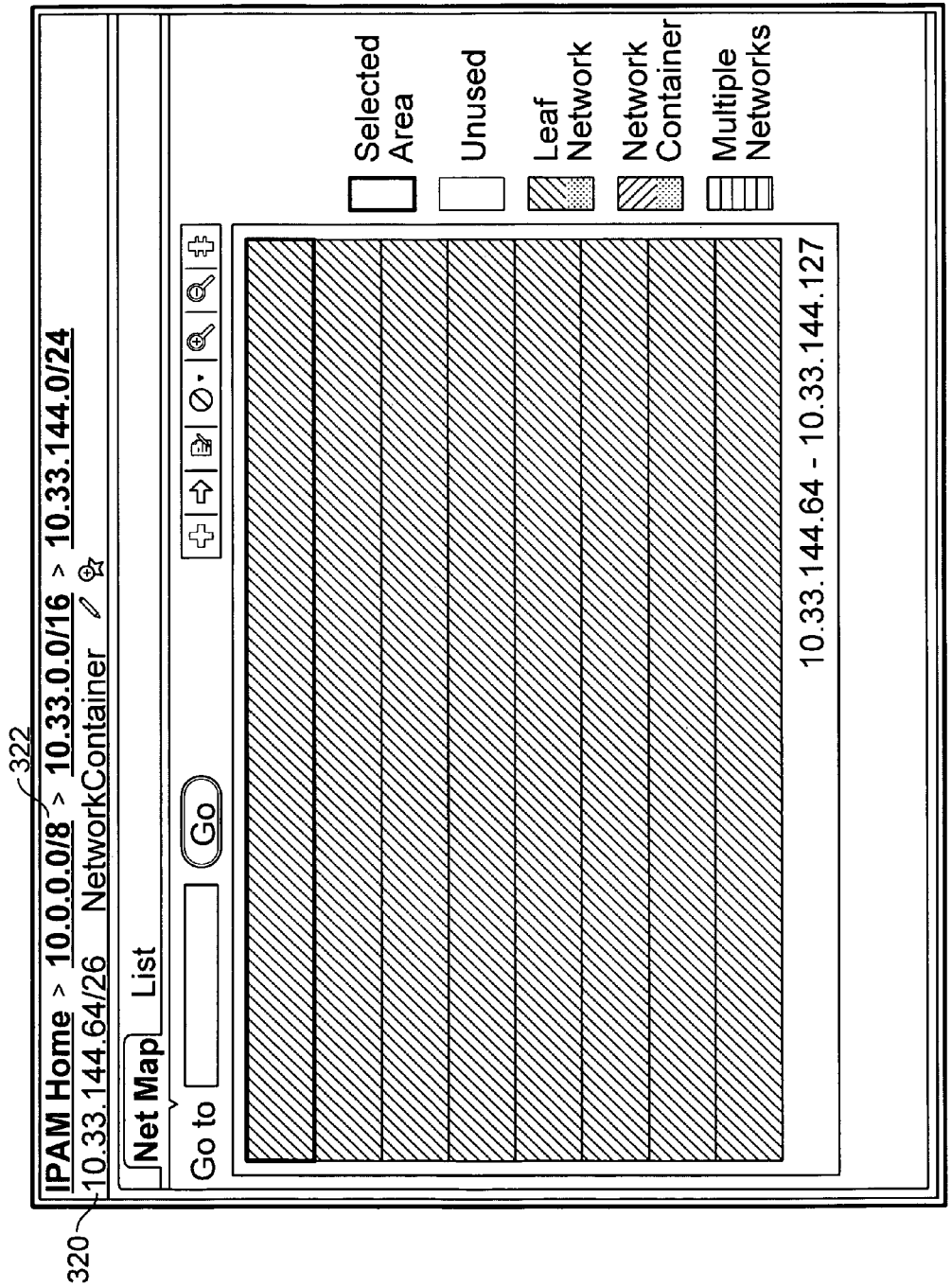
FIG. 3C is a diagram illustrating an embodiment of a graphical interface for navigating within networks in a final network container level.

FIG. 3C is a diagram illustrating an embodiment of a graphical interface for navigating within networks in a final network container level. In some embodiments, the interface depicted in FIG. 3C may be found displayed as a portion, frame and/or widget of a web page in a browser on network administrator interface 102. In some embodiments, the interface depicted in FIG. 3C may follow an administrator asserting an indication 306 for opening the selected network one or more times as shown in FIGS. 3A and 3B. For example, the administrator may reach a final level of subnets in the hierarchy, and use breadcrumbs to show the different levels of networks above the current network with links to go back directly to one or more levels up in the hierarchy.

After traversing one or more levels down, the graphical network map is now of the final leaf network, here shown (320) as "10.33.144.64/26". In some embodiments, a set of "breadcrumbs" (322) is shown to allow the administrator a convenient interface to back up hierarchical levels of network, from 10.33.144.64/26 to 10.33.144.0/24 to 10.33.0.0/16 to 10.0.0.0/8.

In the above cases, or as a general tool, the "Zoom in" function of the map is used to zoom and show a blown up version of an area of the IP Address space. This function is available by asserting an action indication for a zoom (for example, clicking on a zoom in icon or from a right click contextual menu). In some embodiments, once in zoom mode the administrator can select a starting address in the map and drag to an end address. This address range will be the range that will be shown in the map view. The breadcrumbs will be updated to show the range the user has zoomed in to allow navigation hints on how to get back to the full area. In some embodiments there is an action indication to "Zoom out" (for example, clicking on a zoom out icon or from a right click contextual menu) whereby user can go back one level at a time. In some embodiments, beyond these two controls power users may be provided an advanced zoom level manager which allows an administrator to quickly zoom out to any level all the way back to showing the 100% showing the entire network in the map area.

The map may show the starting address and end address along with the map to help administrators better understand the address space they are viewing. At any point the administrator can exit from the zoom mode by asserting an action indication, for example clicking on the zoom icon again.

To illustrate zoom functionality further, another example follows: A currently selected network is 10.1.0.0/16. The current breadcrumb then shows "IPAM Home->10.0.0.0/8" and the map shows content of 10.1.0.0/16 with starting address of 10.1.0.0 and an end address of 10.1.255.255. The administrator asserts a "zoom in" action indication by right clicking or pushing an icon button, and selects the first row of the map by click dragging from the beginning of the first row to the end of the first row. The page will then be updated to a new map page. The breadcrumbs still show "IPAM Home->10.0.0.0/8" and the map shows content of: "10.1.0.0/16 (10.1.0.0-10.1.31.255)". At this point the map's beginning address reads 10.1.0.0 and the end address shows 10.1.31.255. If the administrator selects zoom and selects the first row again, the breadcrumb shows "IPAM Home->10.0.0.0/8" and the map shows content of: "10.1.0.0/16 (10.1.0.0-10.1.3.255)". The beginning address at this point will be 10.1.0.0, and the end address 10.1.3.255. The zoom operation can continue until the address range gets down to minimum of 1024 addresses. This means each row now can display 128 addresses (or about 4 pixels per IP address). The Zoom in icon/menu item is disabled at this point and can no longer be selected. The administrator can assert a "Zoom out" action using a browser back button, clicking on zoom out icon, or by using right click zoom out menu item. The zoom level manager is available at anytime the administrator has zoomed in to a network allowing the administrator to select any zoom level to zoom out.

Throughout the zoom level, the map supports all operations that are supported at the non-zoomed levels. An administrator can add networks, split, join, resize networks, select a network for edit, or open a network to navigate the hierarchy. If an administrator is in a zoom level and changes the tab from Map to List, the list will show the subnets for the network (prior to the zoom operations).

Figure 3D:
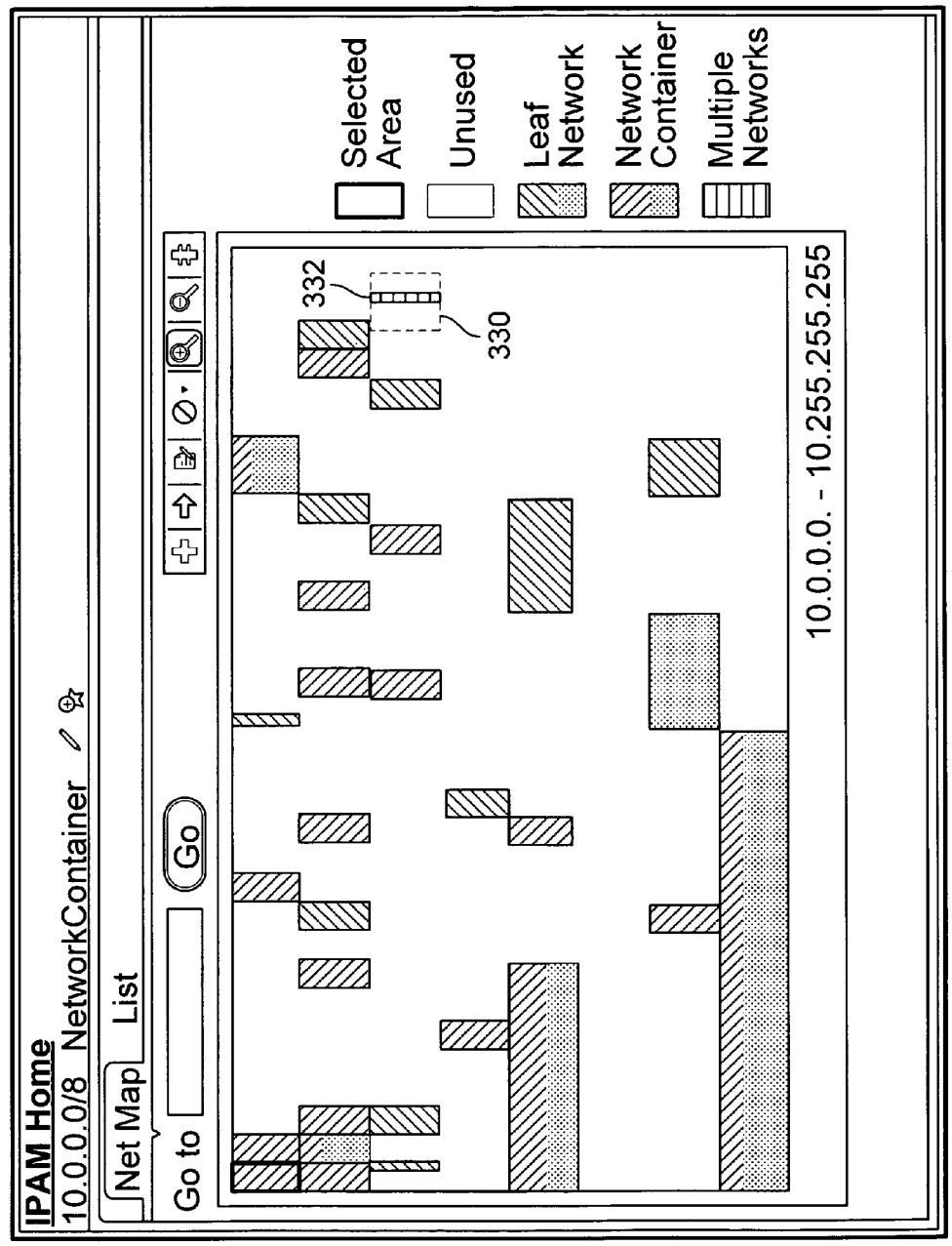
FIG. 3D is a diagram illustrating an embodiment of a graphical interface for navigating within networks for an arbitrary zoom range.

FIG. 3D is a diagram illustrating an embodiment of a graphical interface for navigating within networks for an arbitrary zoom range. In some embodiments, the interface depicted in FIG. 3D may be found displayed as a portion, frame and/or widget of a web page in a browser on network administrator interface 102. For example, the administrator may zoom in/out in the map around a specified area (330). Within the specified area 330 the example shows a multiple networks block (332) with network segments too small to be displayed normally.

Figure 3E:
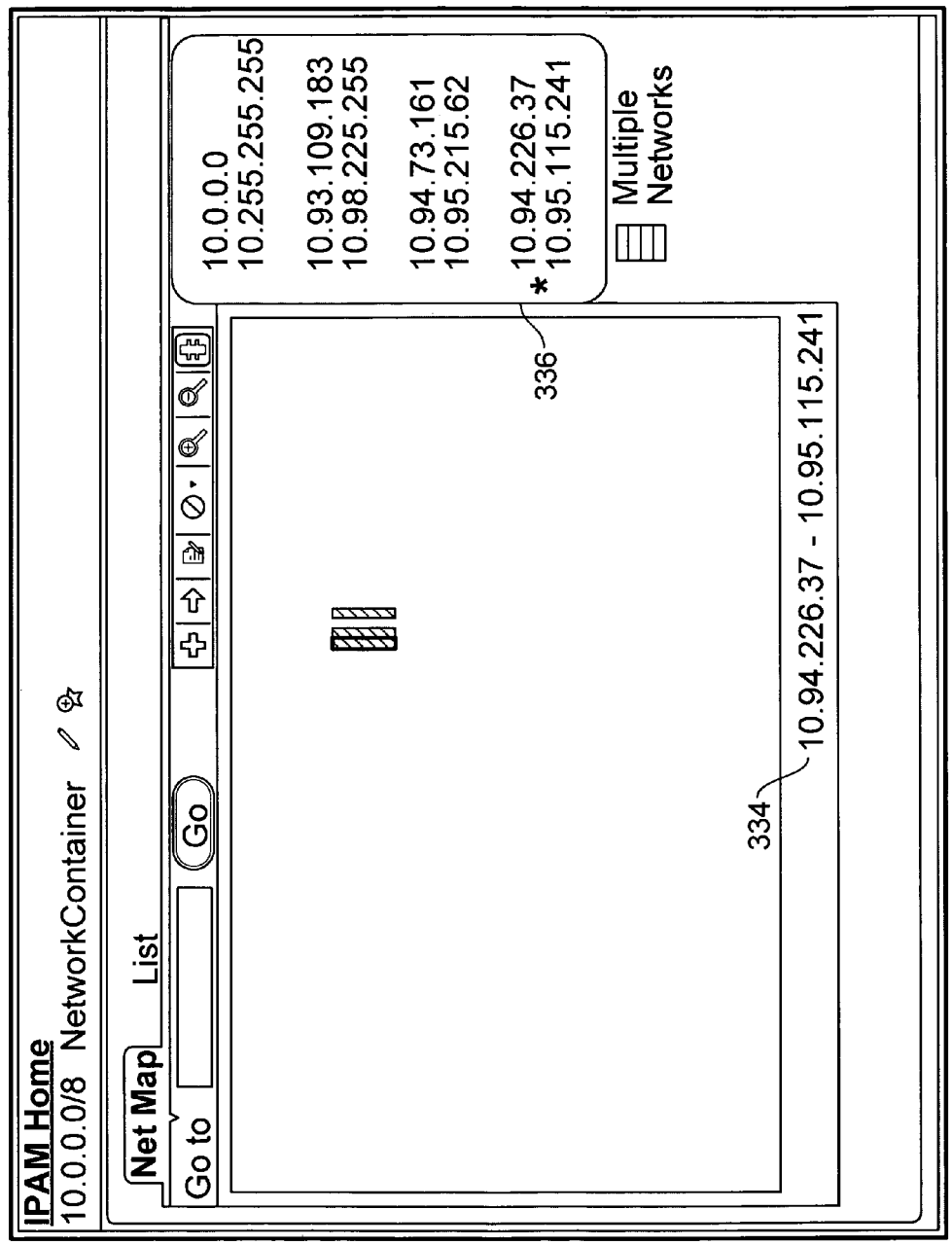
FIG. 3E is a diagram illustrating an embodiment of a graphical interface for navigating within networks within an arbitrary zoom range.

FIG. 3E is a diagram illustrating an embodiment of a graphical interface for navigating within networks within an arbitrary zoom range. In some embodiments, the interface depicted in FIG. 3E may be found displayed as a portion, frame and/or widget of a web page in a browser on network administrator interface 102. In some embodiments, the interface depicted in FIG. 3E may follow an administrator asserting an indication to zoom the arbitrary range 330 as shown in FIG. 3D. For example, the administrator may zoom in multiple times to reach the appropriate scale (334) and a toolbar (336) shows the different zoom levels that were used.

The system permits zooming to an arbitrary range of addresses, not just ones of a power of two, for example the scale 334 is shown in the example to be 10.94.226.37-10.95.115.241. In some embodiments, the administrator can easily go back to a different zoom level by clicking on the desired one in the toolbar 336, or using breadcrumbs (not shown).

Figure 4:
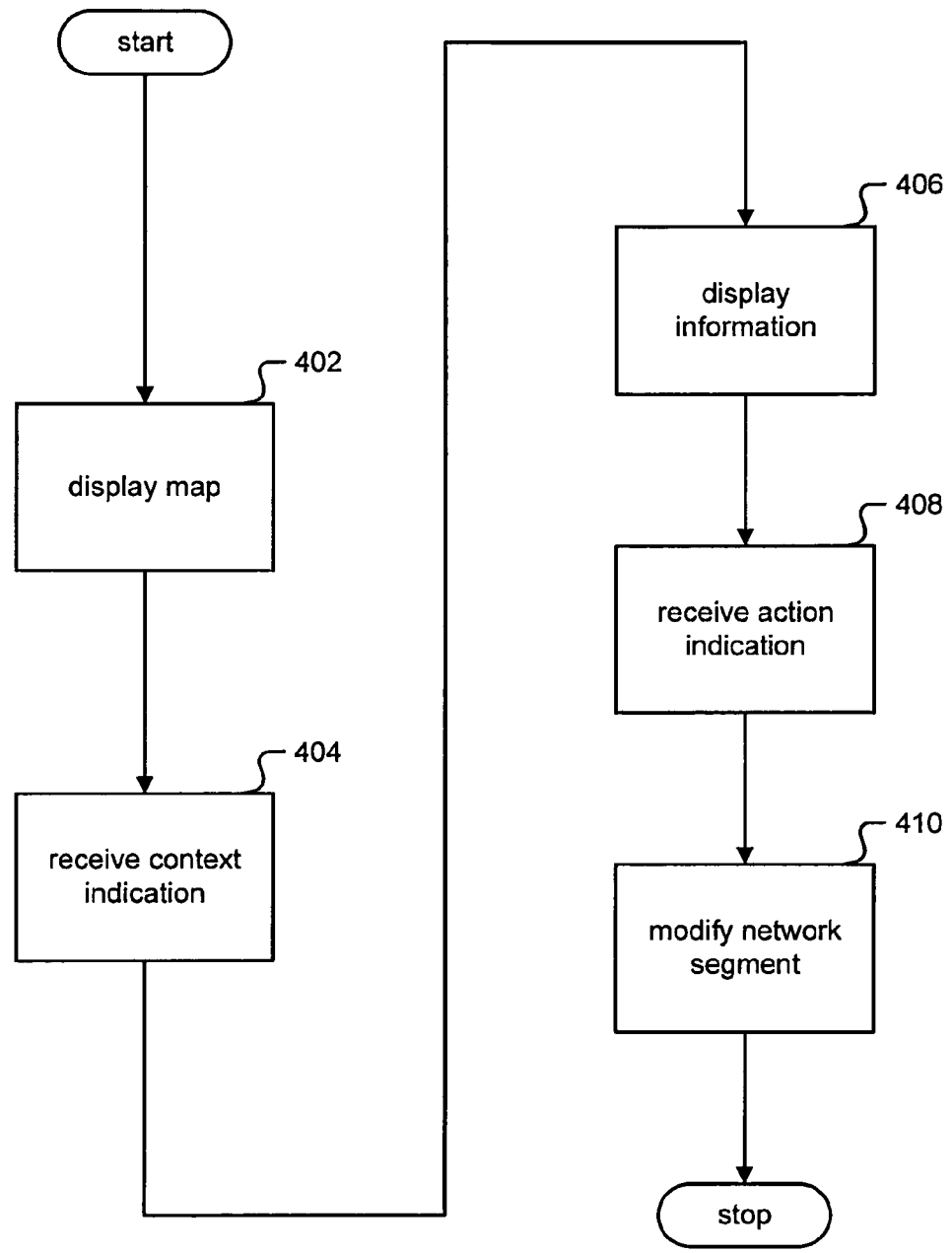
FIG. 4 is a flowchart illustrating an embodiment of a system for managing networks.

FIG. 4 is a flowchart illustrating an embodiment of a system for managing networks. In some embodiments the flowchart of FIG. 4 is performed by network management server 104 of FIG. 1.

In step 402, the server 104 displays a graphical representation of a network map of a network 108-112. In some embodiments, the graphical representation is displayed using the web on a web browser at network administrator interface 102, and examples of the graphical representation are given in FIGS. 2A-3E.

In step 404, the server 104 receives from the administrator a context indication for a network information specification for a first network segment of the network displayed on the graphical representation of the network map of the network from step 402. The context indication can comprise any indication in part using an HID including a click, a drag, a motion, a selected area, a zoom function motion, an add network function motion, a mouse over, or other HID indication. The network information specification can comprise a network address range, a network utilization, a free network address range, a network, a netmask, a set of network addresses, a start network address, and an end network address.

In step 406, the server 104 displays on the graphical representation to the administrator a first information for the first network segment in response to the context indication. The first information can comprise a coloring or detailing of the graphical representation, and text information including: a starting address, an ending address, a largest possible network, the number of subnets that can fit in a space, a network number, a mask, a size of network, how many IP addresses are in a network range, and a network utilization.

In step 408, the server 104 receives an action indication for a network management specification for the first network segment based at least in part on an interaction with the graphical representation of the network. The action indication can comprise: a zoom indication to an arbitrary IP address boundary; a drill down indication, wherein the drill down indication zooms into a second graphical representation of a network map for the first network segment; and an "add subnetwork in empty space" indication, wherein the network management specification for the "add subnetwork in empty space" indication adds a subnetwork in a specified empty space range specified in the action indication.

The network management specification can also comprise a command to create a network within legal boundaries, a command to split the first network segment, a command to resize the first network segment, a command to join the first network segment with a second network segment, and a command to delete the first network segment.

In step 410, the server 104 modifies the first network segment based at least in part on the network management specification in response to the action indication. For example, it splits/resizes/joins/deletes the first network segment as specified in the network management specification. In some embodiments an authorization protocol is used to validate the network management specification before modifying any segment. In some embodiments an authorization protocol is used before any of the other steps 402, 404, 406, 408 to control the flow of information to an authorized or unauthorized user of the system.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
 display a graphical representation of a network map of a network, wherein:
  the graphical representation comprises a rectangular grid, wherein every IP address in a range of IP addresses being actively managed is represented as a rectangular space within the rectangular grid; and
  each rectangular space within the rectangular grid is represented by a pattern indicating a percentage of assigned subnet utilization;
 receive a context indication based at least in part on a first human interface device (HID) pointer manipulation of the rectangular grid, wherein the context indication includes a user network information specification from a user, wherein the user network information specification describes a first network segment of the network displayed on the graphical representation, wherein the first network segment comprises a contiguous range of IP addresses within the range of IP addresses represented within the rectangular grid;
 display on the graphical representation a first information for the first network segment in response to the context indication;
 receive an action indication based at least in part on a second HID pointer manipulation, wherein the action indication includes a network management specification for the first network segment based at least in part on an interaction with the graphical representation, wherein the network management specification comprises one or more of the following: a command to create a new network within the first network segment, a command to split a network within the first network segment, a command to resize a network within the first network segment, and a command to join a network within the first network segment to a second network; and
 modify the first network segment based at least in part on the network management specification in response to the action indication; and
a memory coupled to the processor and configured to provide the processor with instructions.

2. A system as recited in claim 1, wherein the user network information specification comprises one or more of the following: a free network address range, a network, a netmask, a set of network addresses, a start network address, and an end network address.

3. A system as recited in claim 1, wherein the first information comprises one or more of the following: a starting address, an ending address, a largest possible network, the number of subnets that can fit in a space, a mask, a size of network, and how many IP addresses are in a network range.

4. A system as recited in claim 1, wherein the first information comprises a largest possible network that can be created in a network range and how many possible networks can be created with a plurality of octet boundaries.

5. A system as recited in claim 4, wherein the graphical representation comprises a coloring of a network segment corresponding to a high-level network information.

6. A system as recited in claim 1, wherein the graphical representation comprises a coloring of network segment corresponding to a high-level network information, wherein the high-level network information comprises one or more of the following: a network type, a network size, and an indication of free network space.

7. A system as recited in claim 6, wherein the graphical representation comprises a coloring of a network segment corresponding to network utilization for the network segment.

8. A system as recited in claim 7, wherein the graphical representation comprises a coloring of a network segment corresponding to network status for the network segment.

9. A system as recited in claim 1, wherein the context indication comprises one or more of the following: a click, a click and drag, a click and drag over a selected rectangular area, a zoom function motion, and an add network function motion.

10. A system as recited in claim 9, wherein the network management specification comprises a command to create a network within possible boundaries.

11. A method as recited in claim 10, further comprising displaying a slider panel to at least in part determine a plurality of sizes available for the created network.

12. A system as recited in claim 1, wherein the action indication comprises a zoom indication of an arbitrary IP address boundary.

13. A system as recited in claim 12, wherein the action indication comprises a drill down indication, wherein the drill down indication zooms into a second graphical representation of a network map for the first network segment.

14. A system as recited in claim 13, wherein the action indication comprises an add subnetwork in empty space indication, wherein the network management specification for the action indication adds a subnetwork in a specified empty space range specified in the action indication.

15. A system as recited in claim 14, further comprising receiving an authorization protocol to validate the network management specification.

16. A system as recited in claim 14, further comprising receiving an authorization protocol to validate the network management specification, wherein the authorization protocol describes an administrator user level.

17. A method, comprising:
  displaying a graphical representation of a network map of a network, wherein:
    the graphical representation comprises a rectangular grid, wherein every IP address in a range of IP addresses being actively managed is represented as a rectangular space within the rectangular grid; and
    each rectangular space within the rectangular grid is represented by a pattern indicating a percentage of assigned subnet utilization;
  receiving a context indication based at least in part on a first human interface device (HID) pointer manipulation of the rectangular grid, wherein the context indication includes a user network information specification from a user, wherein the user network information specification describes a first network segment of the network displayed on the graphical representation, wherein the first network segment comprises a contiguous range of IP addresses within the range of IP addresses represented within the rectangular grid;
  displaying on the graphical representation a first information for the first network segment in response to the context indication;
  receiving an action indication based at least in part on a second HID pointer manipulation, wherein the action indication includes a network management specification for the first network segment based at least in part on an interaction with the graphical representation, wherein the network management specification comprises one or more of the following: a command to create a new network within the first network segment, a command to split a network within the first network segment, a command to resize a network within the first network segment, and a command to join a network within the first network segment to a second network; and
  using a processor to modify the first network segment based at least in part on the network management specification in response to the action indication.

18. A method as recited in claim 17, wherein receiving an indication for a network information request for a first network segment of the network is performed using a processor.

19. A computer program product, the computer program product being embodied in a non-transitory computer readable storage medium and comprising computer instructions for:
  displaying a graphical representation of a network map of a network, wherein:
    the graphical representation comprises a rectangular grid, wherein every IP address in a range of IP addresses being actively managed is represented as a rectangular space within the rectangular grid; and
    each rectangular space within the rectangular grid is represented by a pattern indicating a percentage of assigned subnet utilization;
  receiving a context indication based at least in part on a first human interface device (HID) pointer manipulation of the rectangular grid, wherein the context indication includes a user network information specification from a user, wherein the user network information specification describes a first network segment of the network displayed on the graphical representation, wherein the first network segment comprises a contiguous range of IP addresses within the range of IP addresses represented within the rectangular grid;
  displaying on the graphical representation a first information for the first network segment in response to the context indication;
  receiving an action indication based at least in part on a second HID pointer manipulation, wherein the action indication includes a network management specification for the first network segment based at least in part on an interaction with the graphical representation, wherein the network management specification comprises one or more of the following: a command to create a new network within the first network segment, a command to split a network within the first network segment, a command to resize a network within the first network segment, and a command to join a network within the first network segment to a second network; and
  modifying the first network segment based at least in part on the network management specification in response to the action indication.

\* \* \* \* \*